(12) United States Patent
Imai (10) Patent No.: US 7,742,653 B2
(45) Date of Patent: Jun. 22, 2010

(54) IMAGE PROCESSING APPARATUS AND IMAGE PROCESSING METHOD

(75) Inventor: Yoshiro Imai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 938 days.

(21) Appl. No.: 11/527,627

(22) Filed: Sep. 27, 2006

(65) Prior Publication Data

US 2007/0071355 A1 Mar. 29, 2007

(30) Foreign Application Priority Data

Sep. 27, 2005 (JP) ............................. 2005-280510

(51) Int. Cl.
 *G06K 9/40* (2006.01)
(52) U.S. Cl. ...................................... 382/264; 382/266
(58) Field of Classification Search ................. 382/254, 382/260, 264, 266, 276; 358/3.26, 3.27
See application file for complete search history.

(56) References Cited

U.S. PATENT DOCUMENTS

| | | | |
|---|---|---|---|
| 6,122,076 A | 9/2000 | Shiota | |
| 6,895,124 B1 * | 5/2005 | Kira et al. | 382/260 |
| 2002/0006230 A1 | 1/2002 | Enomoto | |
| 2003/0016306 A1 | 1/2003 | Ogata et al. | |
| 2006/0170978 A1 * | 8/2006 | Gao et al. | 358/3.26 |

FOREIGN PATENT DOCUMENTS

| | | |
|---|---|---|
| EP | 1 137 258 | 9/2001 |
| EP | 1 137 267 | 9/2001 |
| JP | 9-214766 A | 8/1997 |
| JP | 2001-298619 A | 10/2001 |
| JP | 2003-8898 A | 1/2003 |
| JP | 2004-172726 A | 6/2004 |
| JP | 3568279 B2 | 6/2004 |

OTHER PUBLICATIONS

European Search Report, English.
JP Notification of Reasons for Refusal, dated Jun. 16, 2009, issued in corresponding JP Application No. 2005-280510, 3 pages, Japanese with partial English translation.

* cited by examiner

*Primary Examiner*—Yon Couso
(74) *Attorney, Agent, or Firm*—Sughrue Mion, PLLC (57) ABSTRACT

The image processing apparatus and method process image data of an original image by compressing a dynamic range of the original image. The apparatus and method process the image data of the original image by continuous filtering with at least two edge preserving smoothing filters having different characteristics to generate blurred image data which represents a blurred image of the original image, and process the image data of the original image by compressing the dynamic range of the original image based on the blurred image data. The apparatus includes a blurred image generating unit for generating the blurred image data and having the at least two edge preserving smoothing filters, and a processing unit for compressing the dynamic range of the original image.

2 Claims, 4 Drawing Sheets

IMAGE PROCESSING APPARATUS AND IMAGE PROCESSING METHOD

BACKGROUND OF THE INVENTION

This invention relates to a image processing apparatus and an image processing method by which images taken with a digital still camera (which are hereinafter referred to as DSC images) or images recorded on a film or other images can be processed into appropriate finished photographic prints and the like. The invention particularly relates to an image processing apparatus and an image processing method that can yield finished photographic prints by compressing the dynamic range of the input image to produce a desired output image without causing halo or any other artifacts.

A variety of image processing techniques have conventionally been applied so that DSC images taken with a digital still camera (hereinafter abbreviated as DSC) or film images are processed to have an appropriate finish.

For example, when printing is done from a medium such as a film that has a wide dynamic range of shooting brightness to paper (photographic paper) that has a limited range of reproducible densities, a variety of image processing techniques are employed to ensure that the images recorded on the film are processed to produce appropriate finished photographic prints (refer to JP 3568279 B).

An image processing technique called "hyper tone processing" is also practiced to process DSC images or film images into appropriate finished photographic prints.

In hyper tone processing, input image data is separated into a lower-frequency component and a higher-frequency component and the lower-frequency component is subjected to gradation expansion, with further input image data being added to the gradation-expanded image data so as to produce an output image that remains as well-modulated as the input image and which yet has an expanded gradation. Hyper tone processing has the advantage that when printing is done from a medium such as a film that has a wide dynamic range of shooting brightness to paper (photographic paper) that has a limited range of reproducible densities, the loss of highlights and shadows can be reduced.

Figure 6A:
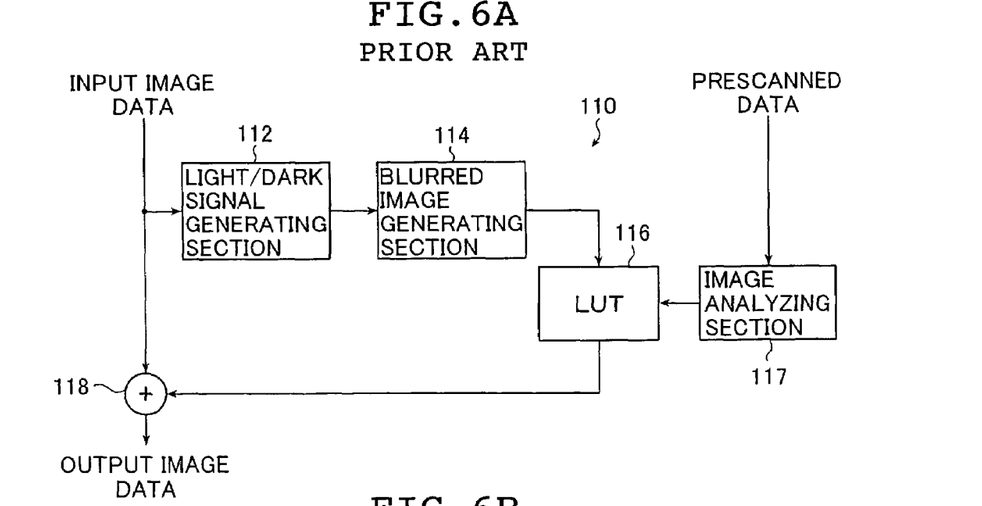
FIG. 6A is a block diagram showing a conventional image processing apparatus that performs hyper tone processing.
Figure 6B:
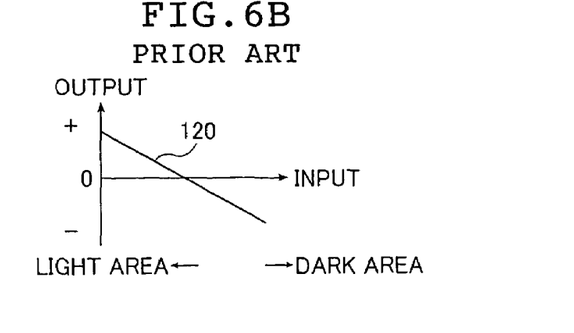
FIG. 6B is a graph depicting a conversion table for the lookup table (LUT) in the conventional image processing apparatus shown in FIG. 6A.

FIG. 6A is a block diagram showing a conventional image processing apparatus that performs hyper tone processing and FIG. 6B is a graph showing a conversion table in a lookup table (LUT) used in the conventional image processing apparatus shown in FIG. 6A.

As shown in FIG. 6A, the conventional image processing apparatus 110 that performs hyper tone processing has a light/dark signal generating unit 112, a blurred image generating unit 114, a lookup table (hereinafter abbreviated to LUT) 116, an image analyzing unit 117, and an adder 118. The input image data has been obtained with a scanner that reads the film having an image of the subject recorded thereon, and the prescanned data has been obtained by reading at a lower resolution than for the input image data.

The light/dark signal generating unit 112 generates binary light/dark image data (Y) from the image data for each of the colors R, G and B in the input image data ($S_R$, $S_G$, $S_B$). The light/dark image data (Y) may be generated by calculating a third of the average taken from the input image data ($S_R$, $S_G$, $S_B$) for the three colors R, G and B. In other words, the light/dark image data is generated as $Y=(S_R+S_G+S_B)/3$.

The blurred image generating unit 114 elicits the lower-frequency component (Y_b) of the light/dark image data generated by the light/dark signal generating unit 112 (said component is hereinafter referred to as blurred image data (Y_b)) and this may be done by using a smoothing filter.

In the LUT 116, the blurred image data (Y_b) generated by the blurred image generating unit 114 is subjected to image processing so as to generate compression processing image data that is to be used in compressing the dynamic range of the input image data. A conversion table is set in the LUT 116 and as FIG. 6B shows, it is represented by a straight line 120 having a constant slope. By means of the LUT 116, the densities of the light areas of an image are added whereas those of the dark areas are subtracted. The central density of the image of the principal subject or the like remains constant.

The image analyzing unit 117 performs image analysis on the prescanned data and it changes the settings of the conversion table in the LUT 116 according to a particular scene.

The adder 118 adds up the input image data ($S_R$, $S_G$, $S_B$) and the blurred image data (Y_b) obtained by processing in the light/dark signal generating unit 112, the blurred image generating unit 114, and the LUT 116. This generates output image data ($O_R$, $O_G$, $O_B$) having a dynamic range compressed in comparison with the principal image data.

The output image data ($O_R$, $O_G$, $O_B$) and the input image data ($S_R$, $S_G$, $S_B$) can be correlated by the following mathematical expressions (1)-(3), in which LUT(Y_b) represents the entry of the blurred image data into the conversion table.

$$O_R=S_R+LUT(Y\_b) \quad (1)$$

$$O_G=S_G+LUT(Y\_b) \quad (2)$$

$$O_B=S_B+LUT(Y\_b) \quad (3)$$

Figure 7:
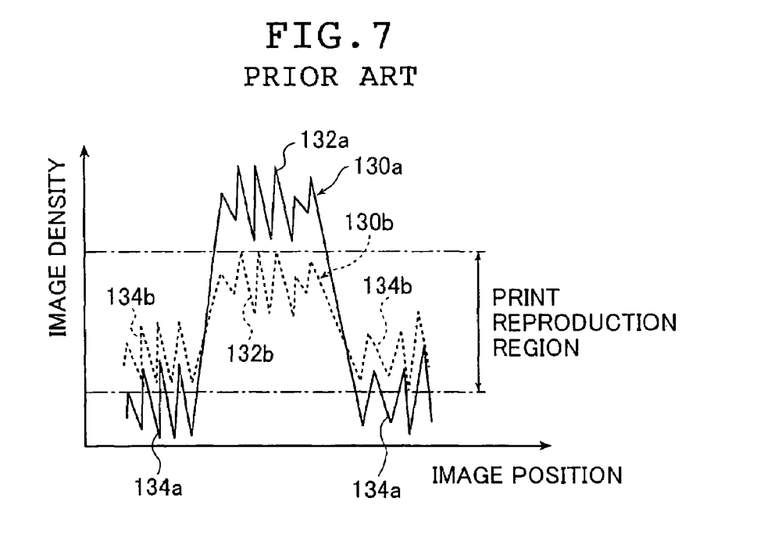
FIG. 7 is a graph that plots image density on the vertical axis and image position on the horizontal axis to depict the conventional image processing method.

In the conventional procedure of hyper tone processing, the input image data and the blurred image data obtained by processing that input image data in the light/dark signal generating unit 112, the blurred image generating unit 114 and the LUT 116 are added together, whereupon the dynamic range of the input image data is compressed nonlinearly to yield the result shown in FIG. 7, where input image data 130a that has a medium to higher frequency component 132a on the high density side and medium to higher frequency components 134a on the low density side has been converted to output image data 130b in which a medium to higher frequency component 132b on the high density side and medium to higher frequency components 134b on the low density side are maintained to lie within the print reproduction region. The output image data 130b thus obtained is appropriate not only in the dynamic range but also in the gradations and densities of the light and dark areas. As a result, photographic prints are produced that reproduce images of high quality.

An image processing apparatus that employs the above-described procedure of hyper tone processing has been proposed (refer to JP 3568279 B).

JP 3568279 B discloses an image reproducing method by which a digital image signal (digital image data) that represents a color image is reproduced as a visible image. In this image reproducing method in JP 3568279 B, the digital image signal is converted to a light/dark signal (light/dark image data) and on the basis of that light/dark signal, a blurred image signal (blurred image data) that represents a blurred image in the color image is generated. Then, subtraction is effected between the digital image signal and a signal for the pixel that corresponds to the blurred image signal, thereby generating a difference signal. A specified image processing procedure is performed on that difference signal to generate a processed image signal. Using this processed image signal, one can prepare photographic prints in which the image has a rather weakened overall contrast whereas the local contrast represented by the higher-frequency component is the same as in the original color image.

In JP 3568279 B, the blurred image signal which represents a blurred image in the color image is generated using a low-pass filter (LPF), so in edge portions that involve significant changes in density, the density changes are not as abrupt as in the original image but are small enough to cause so-called "dull" edge portions. If such a blurred image signal is used to generate the processed image signal, either an undershoot or an overshoot occurs in the edge portions. As a result, the finished prints that are finally obtained might have halo or other artifacts in the edge portions.

Under these circumstances, various methods have so far been proposed with a view to suppressing halo and other artifacts (refer to JP 2001-298619 A, JP 9-214766 A, and JP 2003-8898 A).

JP 2001-298619 A discloses an image processing apparatus having a plurality of low-pass filters and a LUT computing unit that generates a composite blurred image signal.

In the image processing apparatus of JP 2001-298619 A, an image signal for the original images is processed by the plurality of low-pass filters to generate a plurality of blurred image signals that represent a blurred image in the original image, and the generated blurred image signals are assembled in the LUT computing unit to generate a single composite blurred image signal. On the basis of this composite blurred image signal, the image signal for the original image is processed to compress the dynamic range of the latter. As a result, even if the original image is one of high contrast or wide dynamic range that has been taken against light or with the aid of an electronic flash, or even if it contains a relatively flat region such as a low-contrast area, it not only remains sufficiently well-modulated but what is more, one can reduce a pseudo-contour that will occur when the step of compressing the dynamic range is intensely applied. The image processing apparatus of JP 2001-298619 A is so adapted that in an image region that contains edge portions, the composite blurred image signal is adjusted to have a value close enough to a blurred image signal for a small degree of blur.

Figure 8:
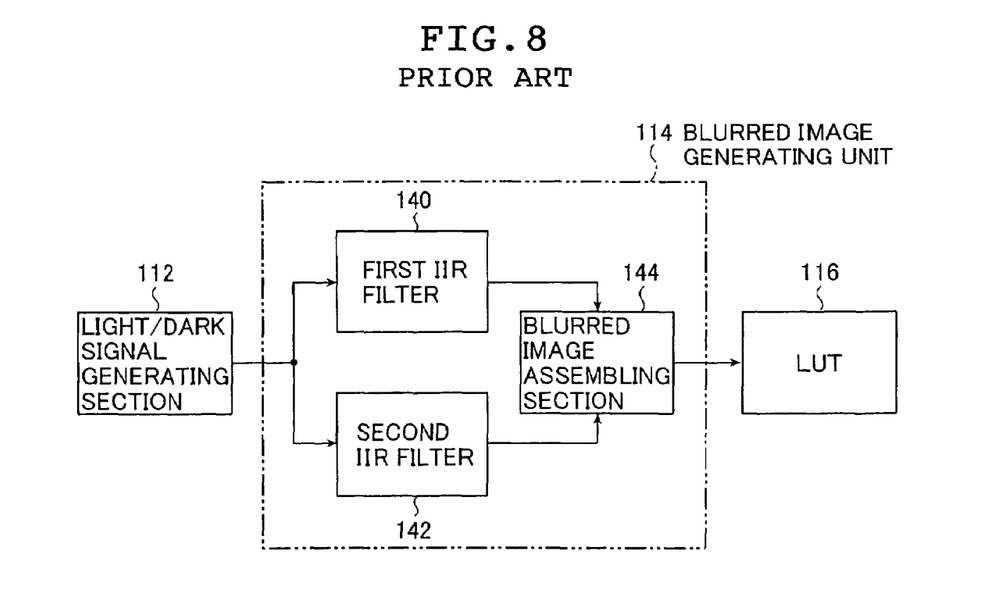
FIG. 8 is a block diagram showing an exemplary blurred image generating unit in the image processing apparatus disclosed in JP 2001-298619 A.

The apparatus of JP 2001-298619 A may be adapted to have the design shown in FIG. 8, where a blurred image generating unit 114 comprises a first IIR (infinite impulse response) filter 140, a second IIR filter 142, and a blurred image assembling unit 144.

The first IIR filter 140 and the second IIR filter 142 are each a kind of low-pass filter that is adapted to generate a blurred image signal. Suppose here that the first IIR filter 140 produces a blurred image signal for a large degree of blur whereas the second IIR filter 142 produces a blurred image signal for a small degree of blur. The blurred image assembling unit 144 is adapted to generate a composite blurred image signal.

Thus, in the image processing apparatus of JP 2001-298619 A, the two IIR filters 140 and 142 cooperate to generate a single composite blurred image signal.

JP 9-214766 A discloses an image processing apparatus that uses a median filter assembly, or a kind of edge preserving smoothing filter, as means of generating a blurred image signal.

In JP 9-214766 A, the median filter assembly comprises a plurality of median filters of different sizes, and the level of intermediate values is selected in accordance with the distribution of digital signals that generate the blurred image signal. In JP 9-214766 A, by using the median filter assembly, one can suppress the occurrence of overshoot in large edge portions.

JP 2003-8898 A discloses an image processing apparatus for converting an input image to an image having a relatively smaller dynamic range. This apparatus comprises smoothing means by which split segments of the input image are respectively smoothed to generate a plurality of smoothed images having different degrees of smoothness, edge intensity calculating means for calculating the edge intensity on the basis of the plurality of smoothed images, assembling means for assembling the plurality of smoothed images on the basis of the calculated edge intensity, coefficient calculating means by which the coefficients for converting the individual pixel values of the input image are calculated on the basis of the composite smoothed image generated by assembling the plurality of smoothed images, and pixel value converting means for converting the individual pixel values of the input image by the calculated coefficients.

In JP 2003-8898 A, filtering and downsampling of the input image are each performed more than once to generate a plurality of smoothed images, which are then assembled together; in this way, the input image is processed by an equivalently large scale of filtering (smoothing) and, as a result, the amounts of computing that are required by the individual steps of filtering and downsampling are sufficiently reduced that less computing needs to be performed for smoothing than when a single large filter is employed. In addition, the edge intensity is calculated on the basis of the plurality of smoothed images and on the basis of this edge intensity, the plurality of smoothed images are assembled together; hence, the downsampling operation causes no adverse effect on the accuracy of edge detection. This offers the advantage that even if illumination is effected under different conditions, their boundaries can be appropriately extracted while requiring smaller amounts of computing and this contributes to realizing a subjectively preferred compression of the dynamic range.

A plurality of epsilon filters are used as the smoothing means in JP 2003-8898 A. They are also a kind of edge preserving smoothing filters.

As described above, if the density range of certain input image data is broader than what can be reproduced on a particular medium such as photographic paper, it has been possible in the conventional technique to compress the selectively extracted lower-frequency component of the input image data, thereby ensuring that the original image is reproduced with the overall image data being compressed while maintaining the medium to higher frequency component.

SUMMARY OF THE INVENTION

However, in order to generate a plurality of blurred images in JP 2001-298619 A, a plurality of low-pass filters such as IIR filters must be used but then difficulty is involved in setting appropriate values for the parameters of low-pass filters.

As a further problem, in a region containing edge portions, the composite blurred image signal is generated using a blurred image signal for a small degree of blur, so the medium to higher frequency component will inevitably remain in the composite blurred image signal and the finally produced image is no longer well-modulated in certain areas.

This is also the case in JP 9-214766 A and JP 2003-8898 A which use an edge preserving smoothing filter. Since edges are preserved, the medium to higher frequency component will inevitably remain in the blurred image signal and the finally produced image is no longer well-modulated in certain areas.

Furthermore, JP 9-214766 A and JP 2003-8898 A involve the problem that if the edge preserving smoothing filter is used in a plurality of stages, difficulty is encountered in setting appropriate values for the parameters of the filter.

The present invention has been accomplished under those circumstances and has as an object of providing an image processing apparatus that can yield finished photographic prints by compressing the dynamic range of the image to produce a desired output image without causing halo or any artifacts.

Another object of the present invention is to provide an image processing method for utilizing the image processing apparatus.

In order to achieve the above objects, a first aspect of the present invention provides an image processing apparatus for processing image data of an original image by compressing a dynamic range of the original image, including: a blurred image generating unit that has at least two edge preserving smoothing filters having different characteristics and which processes the image data of the original image by continuous filtering with the at least two edge preserving smoothing filters to generate blurred image data which represents a blurred image of the original image; and a processing unit that processes the image data of the original image by compressing the dynamic range of the original image based on the blurred image data.

In the present invention, preferably, the at least two edge preserving smoothing filters are each an epsilon ($\epsilon$) filter.

Further, in the present invention, preferably, the blurred image generating unit smoothes a pixel of interest and neighboring pixels in the image data of the original image to generate the blurred image data, the at least two edge preserving smoothing filters have a first epsilon ($\epsilon$) filter which filters signals for neighboring pixels by repeatedly replacing its value of a particular one of the neighboring pixels with a value other than zero if a difference from the signal for the pixel of interest is no smaller than a first threshold value $\epsilon_1$ and a second epsilon ($\epsilon$) filter which filters the signals for the neighboring pixels by repeatedly replacing its value of the particular one with zero if the difference from the signal for the pixel of interest is no smaller than a second threshold value $\epsilon_2$, the second epsilon ($\epsilon$) filter is provided at a stage subsequent to the first epsilon ($\epsilon$) filter, the first threshold value $\epsilon_1$ is set to be greater than the second threshold value $\epsilon_2$, and a first mask size of the first epsilon ($\epsilon$) filter is set to be smaller than a second mask size of the second epsilon ($\epsilon$) filter.

A second aspect of the present invention provides an image processing method for processing image data of an original image by compressing a dynamic range of the original image, including the steps of: processing the image data of the original image by continuous filtering with at least two edge preserving smoothing filters having different characteristics to generate blurred image data which represents a blurred image of the original image; and processing the image data of the original image by compressing the dynamic range of the original image based on the blurred image data.

In the present invention, preferably, the at least two edge preserving smoothing filters are each an epsilon ($\epsilon$) filter.

Further, in the present invention, preferably, the step of generating the blurred image data includes: a step of smoothing a pixel of interest and neighboring pixels in the image data of the original image, a first epsilon ($\epsilon$) filter which filters signals for neighboring pixels by repeatedly replacing its value of a particular one of the neighboring pixels with a value other than zero if a difference from the signal for the pixel of interest is no smaller than a first threshold value $\epsilon_1$ and a second epsilon ($\epsilon$) filter which filters the signals for the neighboring pixels by repeatedly replacing its value of the particular one with zero if the difference from the signal for the pixel of interest is no smaller than a second threshold value $\epsilon_2$ are used as the at least two edge preserving smoothing filters, the first threshold value $\epsilon_1$ is set to be greater than the second threshold value $\epsilon_2$, a first mask size of the first epsilon ($\epsilon$) filter is set to be smaller than a second mask size of the second epsilon ($\epsilon$) filter, and after the image data of the original image is processed by filtering with the first epsilon ($\epsilon$) filter, processing by filtering with the second epsilon ($\epsilon$) filter is performed to generate the blurred image data.

According to the image processing apparatus and the image processing method of the present invention, there is provided a blurred image generating unit that processes the image data of the original image by continuous filtering with at least two edge preserving smoothing filters having different characteristics so as to generate blurred image data which represents a blurred image in the original image, and this ensures that ideal blurred image data can be generated even for that region of the original image where an abrupt density change occurs. As a consequence, in the case of compressing the dynamic range of the input image and obtaining an output image for producing finished photographic prints or the like, a desired output image having no halo or any other artifacts can be easily produced.

In the image processing method according to the present invention, the image data of the original image is processed by continuous filtering with at least two edge preserving smoothing filters having different characteristics so as to generate blurred image data which represents a blurred image in the original image, and this ensures that ideal blurred image data can be generated even for that region of the original image where an abrupt density change occurs. As a consequence, in the case of compressing the dynamic range of the input image and obtaining an output image for producing finished photographic prints or the like, a desired output image having no halo or any other artifacts can be easily produced.

DETAILED DESCRIPTION OF THE PREFERRED EMBODIMENTS

On the following pages, the image processing apparatus and the image processing method of the present invention are described in detail with reference to the preferred embodiment shown in the accompanying drawings.

Figure 1:
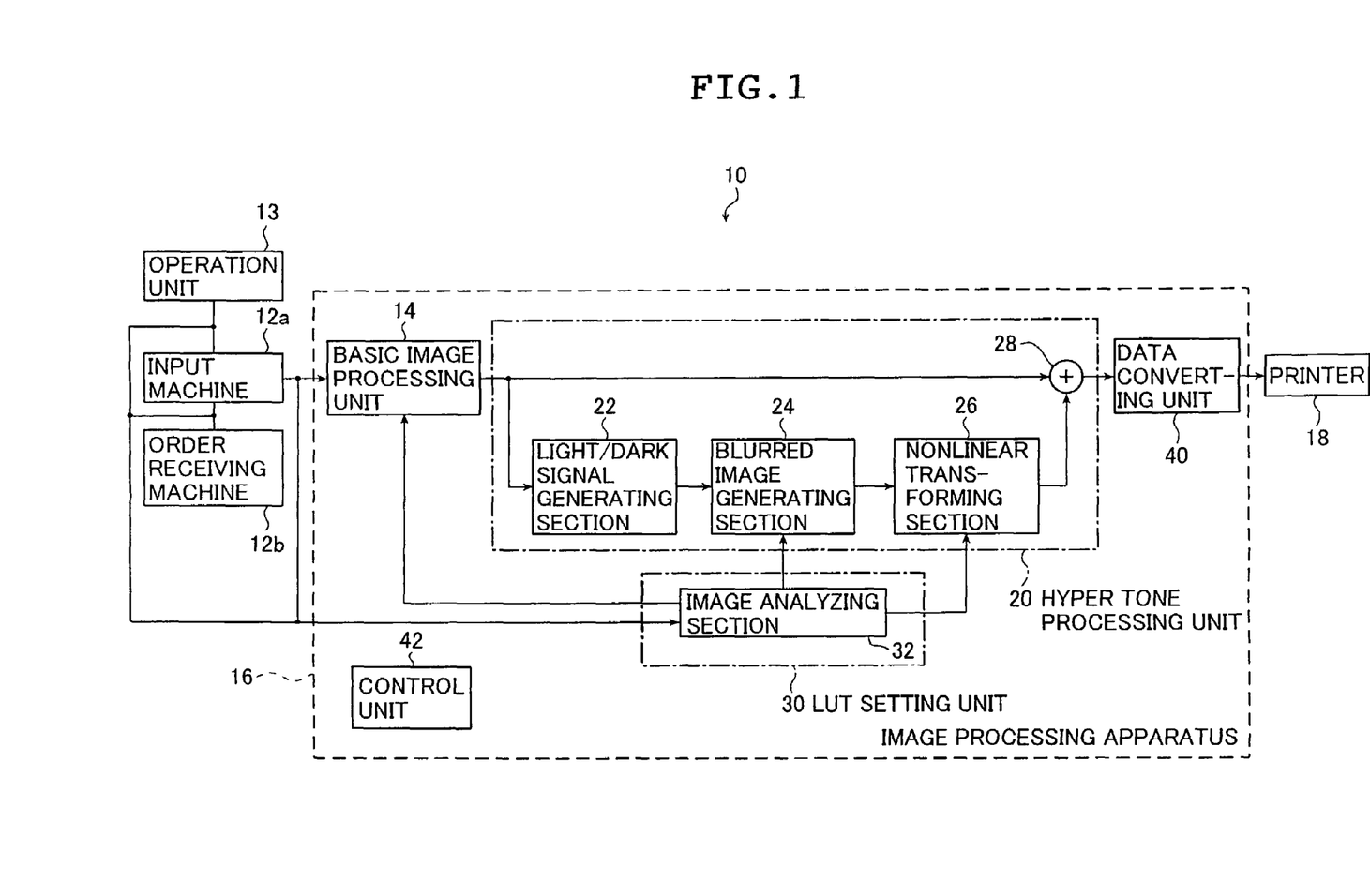
FIG. 1 is a block diagram showing an embodiment of a print system including the image processing apparatus of the present invention.
Figure 2:
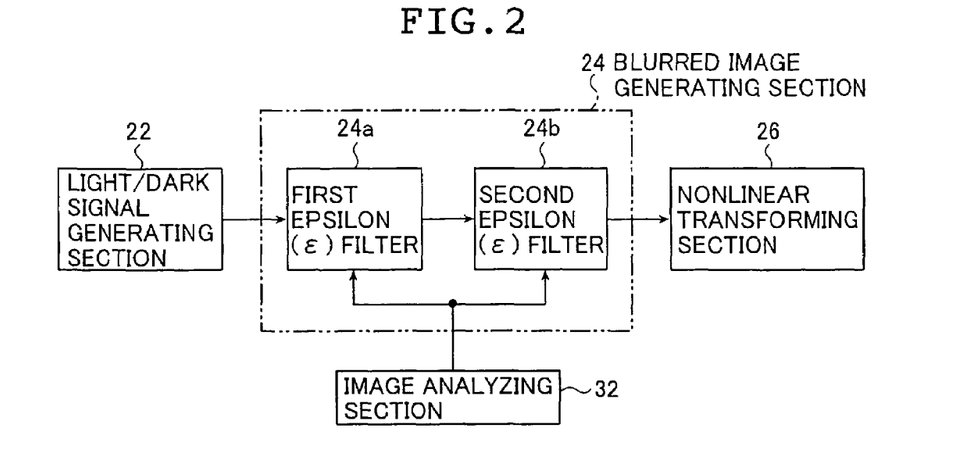
FIG. 2 is a block diagram showing an exemplary configuration of the blurred image generating unit in the image processing apparatus shown in FIG. 1.

FIG. 1 is a block diagram showing an embodiment of a print system including the image processing apparatus of the present invention. FIG. 2 is a block diagram showing an exemplary configuration of the blurred image generating unit in the image processing apparatus shown in FIG. 1.

As shown in FIG. 1, a print system 10 of this embodiment includes an input machine 12a, an order receiving machine 12b, an operation unit 13, the image processing apparatus 16, and a printer 18. The input machine 12a and the order receiving machine 12b are connected to the image processing apparatus 16, which in turn is connected to the printer 18.

The input machine 12a photoelectrically reads the image of a subject recorded on a film, whereupon the input image data is acquired as digital image data and is outputted to the image processing apparatus 16.

The input machine 12a may be a scanner. The scanner is an apparatus with which the images recorded on the film or the like are read photoelectrically frame by frame. The input machine 12a comprises a light source, a variable diaphragm, a color filter plate that has three color filters R (red), G (green) and B (blue) for separating an image into three primary colors R, G and B and which is rotated to get a desired color filter to be inserted into the optical path, a diffuser box which diffuses the reading light incident on the film so that it becomes uniform across the plane of the film, an imaging lens unit, a line CCD sensor which is an area sensor for reading the image in each frame of the film, an amplifier, and a data processing unit (not shown) that processes the R, G and B output signals by various techniques including A/D (analog/digital) conversion, log (density) conversion, DC offset correction, dark correction, and shading correction.

In the scanner, dedicated carriers are available that can be loaded into its body in accordance with the type or the size of the film used (e.g. whether it is a film of the Advanced Photo System (APS) or a negative or reversal film of 135 size), the format of the film (e.g. whether it is a strip or a slide) or other factor. By interchanging carriers, the scanner can be adapted to deal with various kinds of films. The images (frames) that are recorded on the film and which are subjected to the necessary procedure for print production are transported to and held in a specified reading position by means of the carriers.

The carrier adapted to a film of 135 size is equipped with means for reading the DX code. This enables the scanner to read various kinds of information including the film sensitivity, the number of shots taken, the frame number, and the type of the film. These various kinds of information are outputted to the image processing apparatus 16.

As is well known, a magnetic recording medium is preliminarily formed on an APS film to record a certain kind of information such as the cartridge ID or film species. In addition, at a suitable time such as shooting or developing, the magnetic recording medium is capable of recording various kinds of information including the date and time of shooting, the presence or absence of an electronic flash during shooting, the shooting magnification, the ID of a scene taken, the position of the principal part of the image, and the type of the developing machine. The carrier associated with the APS film (cartridge) is equipped with means for reading such magnetic information and in the process of film transport to the reading position, it reads the magnetic information so that the above-mentioned various kinds of information are outputted to the image recording apparatus 16.

Further speaking of the scanner, the reading light from the light source has its quantity adjusted by means of the variable diaphragm, its color adjusted by passing through the color filter plate and then diffused in the diffuser box; the diffused reading light is incident on one frame of the film as it is held in the specified reading position by means of the carrier and thereafter transmits the film to produce projected light bearing the frame's image recorded on the film. The projected light from the film is focused by the imaging lens unit to form an image on the light-receiving plane of the CCD sensor, which performs photoelectric reading of the projected light. The output signals from the CCD sensor are amplified with the amplifier and sent to the image processing apparatus 16. The CCD sensor is typically an area CCD sensor featuring 1380×920 pixels.

In the scanner, the above-described image capturing process is performed three times by sequentially inserting the color filters in the color filter plate into the optical path, whereupon the image of one frame is captured in three separate primary colors of R, G and B.

In the embodiment under consideration, the scanner uses an area CCD sensor and adjusts the reading light by means of the color filter plate such that the original image (the projected light from the film that bears this image) is captured as an image separated into three primary colors. Alternatively, the scanner for supplying image data into the image processing apparatus of the present invention may be an image capturing unit of a slit scan type, in which three line CCD sensors that are associated with the reading of three primary colors R, G and B capture the image with a slit of reading light (projected light) as the film is transported for scan by means of the carrier.

In the scanner, the original image, or the image recorded on each frame of the film, is captured by two scans, the first being prescan at low resolution and the second being fine scan at high resolution. Prescan is performed under appropriate conditions such that the storage time of the area CCD sensor or the stop-down value of the variable diaphragm is so set that the output of the area CCD sensor will not be saturated even if the density of an image recorded on the film is extremely low (as in the case of an underexposed negative image). The prescanned data is outputted to an image analyzing unit 32 in a LUT setting unit 30.

Fine scanned data, or data obtained by fine scan, serves as input image data (the image data of the original image).

Being connected to the input machine 12a and the image processing apparatus 16, the operation unit 13 has an operation system that has a keyboard and a mouse for feeding the input machine 12a and the image processing apparatus 16 with, for example, inputs (settings) of various conditions, selections and instructions for various processes, and instructions for processes such as color/density correction, as well as a display that typically presents the acquired input image, instructions for various operations, and windows in which various conditions are set and/or registered.

The order receiving machine 12b is set up in a lab shop or a convenience store at a suitable point, say, at the counter to receive a customer's order; to this end, the operator enters order information data such as the contents and particulars of the order, which are then received and registered. The order receiving machine 12b is typically composed of a personal computer (PC) having a monitor display screen. The place where the order receiving machine 12b is set up is not limited in any particular way.

Alternatively, the order receiving machine 12b may be of such a type that customers themselves input and register a simple order; in this case, too, the machine is typically composed of a personal computer (PC) having a monitor display screen. The PC of which the order receiving machine 12b is composed may, of course, comprise a monitor (display) as well as input devices such as a keyboard and a mouse, and a memory or a hard disk device (HDD) for a temporary storage of the order information data, software, and the like; the PC is also equipped with a printer for printing a claim receipt that is issued when the order becomes firm. Further, the order receiving machine 12b may be furnished with a media drive for reading out image data and the like from media such as a memory card, CD, MO, and FD. As a result, the DSC image acquired by shooting with a DSC can be converted to input image data.

In another exemplary case, the operator may receive a roll of exposed film at, for example, the counter of a lab shop where the order receiving machine 12b is set up. Images need not be recorded on only one side of the recording medium and they may be recorded on both sides of the recording medium.

In the order receiving machine 12b, when the order information data is entered and the order becomes firm, a relevant item, say, the order reception number is tagged to the order information data and, at the same time, the date and time of order reception is recorded. In addition, the order information data is checked and if the customer is found to have been previously entered, the current effective customer ID is tagged. If the customer is found not to have been previously entered, a new customer ID is tagged. Thus, in the order receiving machine 12b, the order reception number, the date and time of order reception, and the customer ID are tagged to the order information data, which is then outputted to the image processing apparatus 16 together with the image data from which the customer has ordered to make prints. Note that the order receiving machine 12b is equipped with a printer for printing a claim receipt that is issued when the order becomes firm. The format of the claim receipt is not limited in any particular way and all that is required is that the date and time when the customer is expected to get the finished product back and like information should be recorded on the claim receipt.

In the embodiment under consideration, the order information data which is to be entered into the order receiving machine 12b is typically customer information such as the name, telephone number and address of the customer. The order information data may further include, for example, the type of print, the size and number of prints, how the image to be printed should be finished, and the particulars of print processing (the contents of the order) such as whether a print should be made with synthesized templates.

The input image data acquired by the input machine 12a is sent to the image processing apparatus 16 where it is subjected to specified image processing to produce output image data that is to be further processed for outputting from the printer 18. Details of this image processing apparatus 16 will be given later.

The printer 18 prepares photographic prints on the basis of the output image data. In a typical case of its operation, a light-sensitive material is imagewise exposed to an optical beam modulated in accordance with the output image data delivered from the image processing apparatus 16, and then developed to prepare (finished) prints.

The printer 18 is by no means limited to a type that depends on silver halide photography and it may be of a type that records image on paper or other conventional recording media, as exemplified by an ink-jet printer, an electrophotographic printer, or a thermographic printer. The printer 18 may be selected as appropriate for the required image quality or print format; image recording may be done on either one side or both sides of the recording medium.

The image processing apparatus 16 in the embodiment under consideration includes a basic image processing unit 14, a hyper tone processing unit 20, the LUT setting unit 30, a data converting unit 40, and a control unit 42. The hyper tone processing unit 20 and the LUT setting unit 30 constitute the processing means of the present invention.

The data converting unit 40 receives the output image data and converts it to print image data that can be outputted from the printer 18. Conversion of the output image data to the print image data may be performed by a three-dimensional lookup table.

The control unit 42 is connected via lines (not shown) to the basic image processing unit 14, the hyper tone processing unit 20, the LUT setting unit 30 (the image analyzing unit 32) and the data converting unit 40 so that it controls all of these units.

The basic image processing unit 14 performs basic image processing for outputting an image that is appropriate in various aspects such as the image color/density (reproduced tone and color) and the image structure (sharpness and graininess). The basic image processing is required to produce an image that is completed in terms of image quality. The basic image processing includes, for example, the enlargement or reduction (electronic scaling) of the image, its gradation correction, color/density correction, saturation correction, and sharpening.

The hyper tone processing unit 20 includes a light/dark signal generating section 22, a blurred image generating section 24, a nonlinear transforming section 26, and an adder 28.

The light/dark signal generating section 22 generates light/dark image data (Y) from the input image data ($S_R$, $S_G$, $S_B$) (image data for the respective colors R, G and B) that has been entered from the input machine 12a or the order receiving machine 12b. An image constructed from the light/dark image data is called a light/dark image.

While the light/dark image data can be generated by various methods, only two are mentioned here; one is to calculate a third of the average of the image data for the respective colors R, G and B ($S_R$, $S_G$, $S_B$) (as shown by the mathematical expression $Y=(S_R+S_G+S_B)/3$), and the other method is to convert the color image data to the light/dark image data by using the YIQ system. The method of using the YIQ system to obtain the light/dark image data (which is hereinafter sometimes referred to as the Y component data) may be exemplified by the use of the mathematical expression $Y=0.3S_R+0.59S_G+0.11S_B$ in order to calculate only the Y component (brightness) in the YIQ system from the image data for the respective colors R, G and B.

In the blurred image generating section 24, a lower-frequency component is extracted from the light/dark image data (Y) generated in the light/dark signal generating section 22 and, as a result, the light/dark image is blurred two-dimensionally to generate blurred image data (Y_b) (lower-frequency component).

To perform this function, the blurred image generating section 24 includes at least two edge-preserving smoothing filters having different characteristics; the light/dark image data (Y) is processed by continuous filtering with the at least two edge-preserving smoothing filters to generate blurred image data (Y_b) which represents a blurred image in the original image.

Epsilon ($\epsilon$) filters are preferably used as the edge-preserving smoothing filters.

As shown in FIG. 2, the blurred image generating section 24 includes the first epsilon (ε) filter 24a and the second epsilon (ε) filter 24b. The second (ε) filters 24b is provided at the stage subsequent to the first (ε) filter 24a.

Each of the first epsilon (ε) filter 24a and the second epsilon (ε) filter 24b is connected to the image analyzing section 32.

As will be described later, the first epsilon (ε) filter 24a may be so adapted that various parameters such as the threshold value (ε) and the mask size that have been set by the image analyzing section 32 are set in this first epsilon (ε) filter 24a by means of the control unit 42. Similarly, the second (ε) filter 24b may be so adapted that various parameters such as the threshold value (ε) and the mask size that have been set by the image analyzing section 32 are also set in this second epsilon (ε) filter 24b by means of the control unit 42.

In the blurred image generating section 24, the light/dark image data (Y) that has been generated in the light/dark signal generating section 22 first enters the first epsilon (ε) filter 24a, then gets into the second epsilon (ε) filter 24b so that the light/dark image data (Y) is processed by continuous filtering with the first epsilon (ε) filter 24a and the second epsilon (ε) filter 24b to generate the blurred image data (Y_b).

The epsilon (ε) filters are for removing small-amplitude noise and may be defined by the following mathematical expression (4), in which y(n) represents the value of an output signal and x(n) represents the value of an input signal. The symbol $\alpha_K$ in mathematical expression (4) represents a constant that determines the mask size of a filter and the weight for each pixel and which satisfies the condition represented by the following mathematical expression (5). A function f(x) that satisfies both the mathematical expressions (4) and (5) takes a nonlinear form as represented by the following mathematical expression (6), in which β is a constant.

$$y(n) = x(n) - \sum_{k=-N}^{N} \alpha_k f\{x(n) - x(n-k)\} \quad (4)$$

$$\sum_{k=-N}^{N} \alpha_k = 1 \quad (5)$$

$$f(x) = \begin{cases} x(x \leq \varepsilon) \\ \beta(x > \varepsilon) \end{cases} \quad (6)$$

Figure 3:
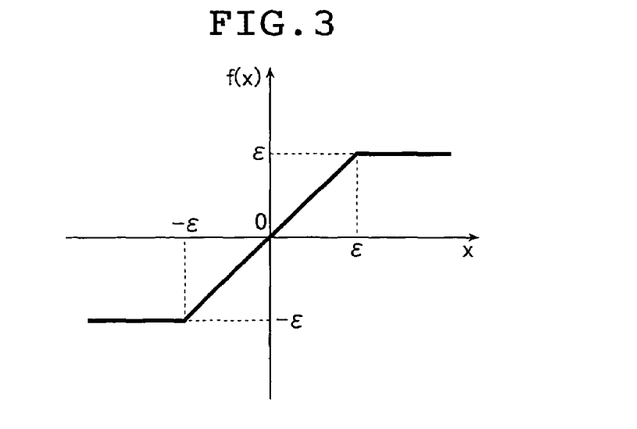
FIG. 3 is a graph that plots output signal value on the vertical axis and input signal value on the horizontal axis to depict the characteristics of the first epsilon ($\epsilon$) filter in the blurred image generating unit in the image processing apparatus shown in FIG. 1.

If β=ε in mathematical expression (6), the function takes the shape shown in FIG. 3. If β=0 in mathematical expression (6), the function takes the shape shown in FIG. 4.

Figure 5:
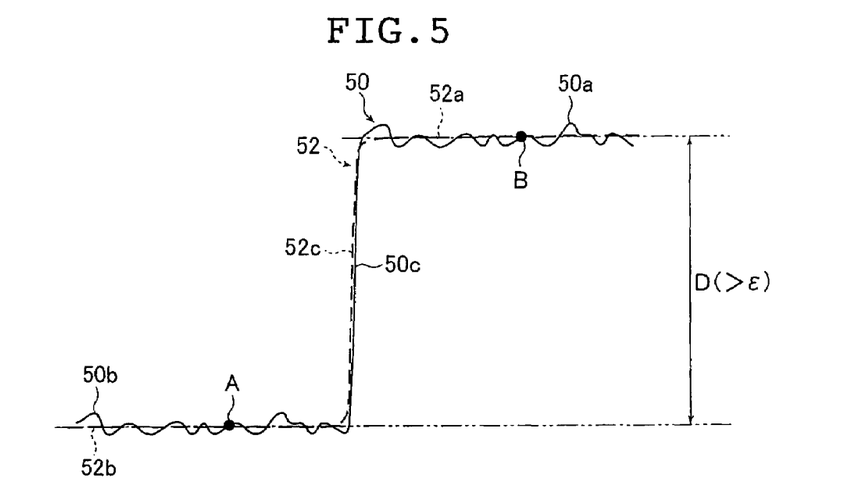
FIG. 5 shows schematically the input image data and the blurred image data obtained from the image processing apparatus shown in FIG. 1.

Take, for example, the case where input image data that is characterized by a stepwise change in density distribution as indicated by 50 in FIG. 5 is processed by filtering with the epsilon (ε) filter. The input image data 50 shown in FIG. 5 is filtered at point A. Assume here that the difference D of the pixel values between point A and each of point B where a weighted average is taken and a neighboring pixel around point B is greater than the threshold value (ε), which represents the difference in density.

Figure 4:
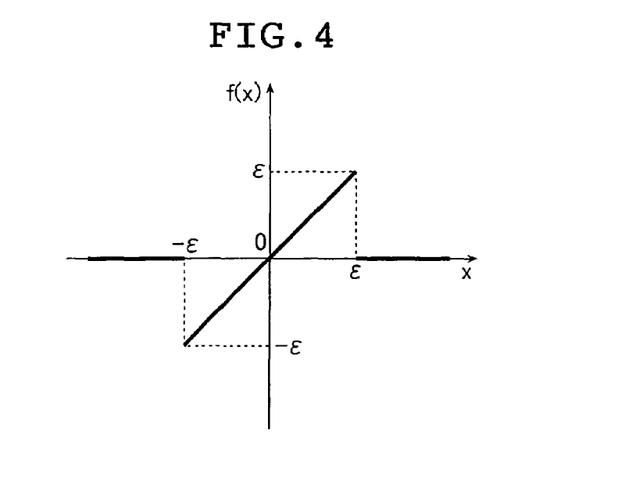
FIG. 4 is a graph that plots output signal value on the vertical axis and input signal value on the horizontal axis to depict the characteristics of the second epsilon ($\epsilon$) filter in the blurred image generating unit in the image processing apparatus shown in FIG. 1.

In the case of processing by filtering with an epsilon (ε) filter having the characteristics shown in FIG. 4, the pixel value of point B for the pixel of interest in the input image data 50 and the pixel values of neighboring pixels around point B are replaced by the pixel value of point A for taking a weighted average. This is equivalent to smoothing the pixel values of point A and neighboring pixels around it separately from the pixel values of point B for the pixel of interest and neighboring pixels around it. As a result, smoothing can be done without degrading the sharp edge portion 50c of the input image data that occurs between point A and point B for the pixel of interest in the input image data 50. In other words, the two higher-frequency components 50a and 50b in the input image data 50 are smoothed separately and can hence be smoothed without blunting the edge portion 50c.

The blurred image data 52 thus generated by using the epsilon (ε) filter is such that a small-amplitude portion whose amplitude is equal to or smaller than the threshold value ε is made blurry whereas an edge portion whose amplitude is larger than the threshold value ε is not made blurry but retains its state. In other words, the halo-causing edge portion of large amplitude will degrade less than in the case of the blurred image data generated by using the conventional other filters. As a result, the dynamic range of the input image can be compressed while suppressing the occurrence of halo or any other artifacts.

The first epsilon (ε) filter 24a has a function in which β=ε in mathematical expression (6) and it also has the characteristics of the graph shown in FIG. 3.

The first epsilon (ε) filter 24a smoothes a pixel of interest in the image data for the original image and neighboring pixels in the process of generating the blurred image data (Y_b). The first epsilon (ε) filter 24a filters the signal for a particular neighboring pixel among the neighboring pixels by replacing its value with values other than zero if the difference between the signal for the pixel of interest and a signal for each neighboring pixel is no smaller than the first threshold value $\varepsilon_1$.

In the blurred image generating section 24 according to the embodiment under consideration, the first epsilon (ε) filter 24a smoothes data in excess of the threshold value ε at any data point by replacing it with the value of the data point±the threshold value ε; this will somewhat degrade the edge retainability but, on other hand, the performance of the smoothing operation can be improved. In other words, a filter having the characteristics shown in FIG. 3 is used as the first epsilon (ε) filter 24a so that a certain degree of edge degradation is tolerated while securing the amount of blur that is required to generate satisfactory blurred image data. To this end, the other parameters are so set as to give priority to the edge retainability; to be more specific, the mask size (the range of the mask) is set small enough to prevent excessive loss of the local contrast whereas the threshold value ε is so set that no large halo will occur. The first epsilon (ε) filter 24a determines the edge size (density difference) which serves as a threshold for grouping the pixels to be smoothed. In short, the first epsilon (ε) filter 24a separates by size the edges that need to be blurred from those that need not be blurred.

The second epsilon (ε) filter 24b has a function in which β=0 in mathematical expression (6) and it has the characteristics of the graph shown in FIG. 4.

The second epsilon (ε) filter 24b smoothes a pixel of interest in the image data for the original image and neighboring pixels in the process of generating the blurred image data (Y_b). The second epsilon (ε) filter 24b filters the signal for a particular neighboring pixel among the neighboring pixels by replacing its value with zero if the difference between the signal for the pixel of interest and a signal for each neighboring pixel is no smaller than the second threshold value $\varepsilon_2$.

The second epsilon (ε) filter 24b smoothes data in excess of the threshold value ε at any data point by replacing it with the value of the data point; this enhances the edge retainability but, on the other hand, no satisfactory smoothing is guaranteed.

The purpose of the second epsilon (ε) filter 24b is two-fold: one is to eliminate all the effects of the edge portion that will degrade somewhat by processing with the first epsilon (ε) filter 24a; the second is to further smooth the higher-frequency portions that have not been fully smoothed by processing with the first epsilon (ε) filter 24a.

The parameters of the second epsilon (ε) filter 24b are so set as to give priority to assuring an adequate amount of blur. To be more specific, the second epsilon (ε) filter 24b is designed to have a sufficiently larger mask size (a wider range of the mask) than the first epsilon (ε) filter 24a to assure the range to be blurred; on the other hand, the second epsilon (ε) filter 24b is designed to have a sufficiently smaller threshold value ε than the first epsilon (ε) filter 24a to eliminate the effects of edge degradation that has occurred in processing with the first epsilon (ε) filter 24a. As a result, the size by which the first epsilon (ε) filter 24a separates the edges that need to be blurred from those that need not be blurred is sufficient for the purpose of assuring satisfactory smoothing.

Thus, in the blurred image generating section 24 according to the embodiment under consideration, the first threshold value $ε_1$, or the threshold value ε of the first epsilon (ε) filter 24a, is set to be larger than the second threshold value $ε_2$, or the threshold value ε of the second epsilon (ε) filter 24b, and the first mask size of the first epsilon (ε) filter 24a is set to be smaller than the second mask size of the second epsilon (ε) filter 24b.

In the blurred image generating section 24 according to the embodiment under consideration, the two edge preserving smoothing filters 24a and 24b having different characteristics are provided and by consecutive filtering with the first epsilon (ε) filter 24a and the second epsilon (ε) filter 24b, even the input image data 50 that is shown in FIG. 5 to have the edge portion 50c that changes stepwise in density distribution can be processed to produce the blurred image data that is indicated by 52 in FIG. 5 and which is nearly ideal in that the large edge portion 50c which needs to be preserved remains as it is whereas the higher-frequency portions 50a and 50b have been adequately smoothed.

As a result, the present invention enables a more ideal mask to be generated using a fewer filters than would be required to synthesize one blur mask from a plurality of blur masks.

In the nonlinear transforming section 26, the blurred image data (lower-frequency component) that has been obtained by the blurred image generating section 24 is subjected to image processing so that compression processing image data (LUT (Y_b)) for compressing the input image data by the amount of compression based on the compression conditions set by the LUT setting unit 30 as will be described later is generated on the basis of the blurred image data (Y_b) and the amount of correction or solely on the basis of the blurred image data (Y_b). The compression processing image data (LUT(Y_b)) indicates how much of the input image data ($S_R$, $S_G$, $S_B$) should be compressed. Provided in the nonlinear transforming section 26 is a conversion table such as a rewritable LUT (lookup table) by means of which the compression processing image data (LUT(Y_b)) for compressing the input image data ($S_R$, $S_G$, $S_B$) by the amount of compression set by the LUT setting unit 30 is generated on the basis of the blurred image data (Y_b) and the amount of correction or solely on the basis of the blurred image data (Y_b).

The amount by which the input image data ($S_R$, $S_G$, $S_B$) should be compressed and which is indicated by the compression processing image data (LUT(Y_b)) generated in the nonlinear transforming section 26 is finally set on the basis of image analysis, to be described later, that is performed by the image analyzing section 32 in the LUT setting unit 30, such that each image is optimized for each scene. The amount by which the dynamic range is compressed in the nonlinear transforming section 26 varies from one scene to another. In other words, the settings in the conversion table in the nonlinear transforming section 26 are altered by scene and by means of the LUT setting unit 30.

The adder 28 takes the sum of the input image data ($S_R$, $S_G$, $S_B$) and the compression processing image data (LUT(Y_b)) generated by the nonlinear transforming section 26. When the input image data ($S_R$, $S_G$, $S_B$) and the compression processing image data (LUT(Y_b)) are added together in the adder 28, the dynamic range of the input image data is compressed to produce output image data ($O_R$, $O_G$, $O_B$) which is to be further processed for outputting. The adder 28 has essentially the same configuration as the adder 118 in the conventional hyper tone processing apparatus 110 shown in FIG. 6A.

The LUT setting unit 30 determines the amount by which the dynamic range of the input image data ($S_R$, $S_G$, $S_B$) should be compressed. This LUT setting unit 30 has the image analyzing section 32.

The image analyzing section 32 has the basic function of setting the conversion table in the nonlinear transforming section 26 of the hyper tone processing unit 20. The image analyzing section 32 uses the prescanned data to set the amount by which the dynamic range of the image of a subject (input image data ($S_R$, $S_G$, $S_B$) ) should be compressed, or the condition for compressing the dynamic range.

The image analyzing section 32 also has this function; on the basis of the prescanned data for each of the images entered, it extracts the data of a region corresponding to each frame (image) in the film, detects the image's position, and sets (computes) the image processing conditions for each image and the reading condition for fine scan.

In the image analyzing section 32, the prescanned data for each image is used to perform various operations for each image, as exemplified by the construction of density histograms and calculation of image characterizing quantities such as average density, LATD (large-area transmission density), highlights (minimum density) and shadows (maximum density). Subsequently, from the information about the film species that has been read by the carrier, the image analyzing section 32 evaluates the state of the original image and calculates the storage time of the area CCD sensor or the stop-down value of the variable diaphragm such that for each image, the output from the area CCD sensor will be saturated at a slightly lower density than the minimum density of the original image, and the calculated value is used as the reading condition for fine scan. Furthermore, the image processing conditions for the input image data (fine scanned data) in the basic image processing unit 14 are set on the basis of the density histograms, image characterizing quantities, film information and the like.

In the image analyzing section 32, parameters such as the threshold values of the first epsilon (ε) filter 24a and the second epsilon (ε) filter 24b in the blurred image generating section 24 and the mask size can also be set for each image on the basis of the density histograms, image characterizing quantities, the film information, and the like. The various parameters set in the image analyzing section 32 may alternatively be set by the control unit 42 as various parameters of the first epsilon (ε) filter 24a and the second epsilon (ε) filter 24b.

The image analyzing section 32 in the embodiment under consideration finally outputs the setting of the amount of compression of the dynamic range to the nonlinear transforming section 26, typically as a gradation control signal. This output signal indicates the amount by which the dynamic range of the input image data is to be compressed in the nonlinear transforming section 26.

In the embodiment under consideration, the input image data ($S_R$, $S_G$, $S_B$) is correlated to the output image data ($O_R$, $O_G$, $O_B$) by the following mathematical expressions (7)-(9), in which LUT(Y_b) represents the entrance of the blurred image data into the conversion table.

As is apparent from mathematical expressions (7)-(9), the respective colors R, G and B are compressed in the embodiment under consideration without causing any change in hue.

$$O_R = S_R + LUT(Y\_b) \quad (7)$$

$$O_G = S_G + LUT(Y\_b) \quad (8)$$

$$O_B = S_B + LUT(Y\_b) \quad (9)$$

In the image processing apparatus 10 according to the embodiment under consideration, the blurred image generating section 24 can produce the nearly ideal blurred image data 52 (see FIG. 5) from the input image data 50 and, therefore, in the process of compressing the dynamic range of the original image, the operator can suppress the occurrence of an undershoot or overshoot in the edge portions of the original image in which halo or other artifacts are prone to occur. As a result, the operator can also get finished (photographic) prints in which the occurrence of halo or other artifacts is sufficiently suppressed. Being thusly capable of suppressing the occurrence of halo or other artifacts, the image processing apparatus 16 according to the embodiment under consideration can produce output image data that has the input image data compressed to be within the print reproduction region of photographic paper or the like and which yet remains as well-modulated as the original image (input image data). Consequently, the printer 18 can be operated to produce finished (photographic) prints of high enough image quality.

The operation of the image processing apparatus 16 according to the embodiment under consideration (i.e., the image processing method of the present invention) is specifically described below.

Prior to fine scan, the film having images recorded thereon is subjected to prescan for each of the colors R, G and B so as to acquire prescanned data for each color.

Then, in the image analyzing section 32, the prescanned data is used to perform various operations for each image, as exemplified by the construction of density histograms and calculation of image characterizing quantities such as average density, LATD (large-area transmission density), highlights (minimum density) and shadows (maximum density). Furthermore, from the information about the film species, the image analyzing section 32 evaluates the state of the original image and calculates the storage time of the area CCD sensor or the stop-down value of the variable diaphragm such that for each image, the output from the area CCD sensor will be saturated at a slightly lower density than the minimum density of the original image, and the calculated value is used as the reading condition for fine scan.

In the image analyzing section 32, parameters such as the threshold values of the first epsilon ($\epsilon$) filter 24*a* and the second epsilon ($\epsilon$) filter 24*b* in the blurred image generating section 24 and the mask size can also be set for each image on the basis of the density histograms, image characterizing quantities, the film information, and the like.

In the next step, the settings of the conversion table in the nonlinear transforming section 26 are altered for a particular scene and they are also changed to provide an appropriate color balance. In this way, the color balance is corrected as required for setting the conditions for compressing the dynamic range.

Then, the film having images recorded thereon is subjected to fine scan which is performed with the scanner under the reading conditions set by prescan, and this produces input image data (fine scanned data).

In the next step, the input image data is fed into the basic image processing unit 14, in which basic image processing for outputting an image that is appropriate in various aspects such as the image color/density (reproduced tone and color) and the image structure (sharpness and graininess) are performed on the input image data under the image processing conditions set by prescan.

The input image data is then outputted to the hyper tone processing unit 20 (i.e., the light/dark signal generating section 22 and the adder 28) in the image processing apparatus 16. In the hyper tone processing unit 20, the light/dark signal generating section 22 first generates the Y-component data (the light/dark image data) (Y) from the input image data.

In the next step, the Y-component data is outputted into the blurred image generating section 24. In the blurred image generating section 24, the Y-component data (Y) is processed by continuous filtering with the first epsilon ($\epsilon$) filter 24*a* and the second epsilon ($\epsilon$) filter 24*b* to generate the blurred image data (Y_b) from the Y-component data (Y). The blurred image data (Y_b) is outputted to the nonlinear transforming section 26.

The blurred image data (Y_b) has the same density distribution as the input image data except that it has been freed of the higher-frequency component. In the embodiment under consideration, the edge portion 52*c* of the blurred image data 52 which corresponds to the edge portion 50*c* of the input image data 50 is reserved without experiencing any change in its characteristics. To be specific, the edge portion 52*c* of the blurred image data 52 stands generally vertical like the edge portion 50*c* of the input image data 50. It should be noted here that the higher-frequency portions 52*a* and 52*b* of the blurred image data 52 which correspond to the higher-frequency portions 50*a* and 50*b* of the input image data 50 have been smoothed.

In the blurred image generating section 24, the blurred image data is generated by performing two-dimensional filtering with the first epsilon ($\epsilon$) filter 24*a* which is applied in a main scan direction and the second epsilon ($\epsilon$) filter 24*b* which is applied in an auxiliary scan direction perpendicular to the main scan direction. If desired, each of the first epsilon ($\epsilon$) filter 24*a* and the second epsilon ($\epsilon$) filter 24*b* may be configured as a two-dimensional filter and used to filter the Y-component data (Y).

In a separate step, the setting of the amount of compression of the dynamic range that has been determined by the LUT setting unit 30 is outputted as, for example, a gradation control signal into the nonlinear transforming section 26 in the hyper tone processing unit 20. Consequently, the conversion table in the nonlinear transforming section 26 is altered in accordance with the amount of compression to establish final settings.

In the next step, compression processing image data for compressing the input image data by the amount of compression that has been set by the LUT setting unit 30 is generated from the lower-frequency component of the Y-component data by the nonlinear transforming section 26. The compression processing image data is then outputted to the adder 28, where the input image data and the compression processing image data are added together to produce the output image data ($O_R$, $O_G$, $O_B$) with the compressed dynamic range.

In the embodiment under consideration, the output image data ($O_R$, $O_G$, $O_B$) has the dynamic range of the input image data compressed to be within the print reproduction density region of photographic paper or the like while preserving the higher-frequency component of the input image data. Since the blurred image data reproduces the characteristics of the input image data in a nearly ideal state, the data with the compressed dynamic range is also nearly ideal in that its edge portions are so maintained as to reflect the density distribution of the input image data. Consequently, the edge portions are most unlikely to have an overshoot on the higher-density side or an undershoot on the lower-density side. Because of this ability to suppress the occurrence of an overshoot and an undershoot in the edge portions which tend to experience substantial changes in the image density, the image processing apparatus 16 in the embodiment under consideration can produce finished prints that are free from halo or other artifacts.

In the next step, the output image data ($O_R$, $O_G$, $O_B$) is outputted to the data converting unit 40, where it is converted to print image data that is compatible with the printer 18. This is how the image processing apparatus 16 generates print image data that can be outputted from the printer 18. On the basis of this print image data, the printer 18 can produce finished (photographic) prints of high enough image quality without halo or other artifacts that reproduces the original images (input image data) and which yet remains as well-modulated as the original images.

In the image processing apparatus 16 according to the embodiment under consideration, the digital image data which the input machine 12a has acquired for the images recorded on the film is so processed that depending upon the image of the subject, the amount by which the dynamic range of the input image data is to be compressed (the compression condition) is appropriately set and the conversion table in the nonlinear transforming section 26 is altered in accordance with the thus set amount of compression to establish the final settings; in this way, the operator can get output image data that can produce photographic prints of high enough image quality without halo or other artifacts that reproduces the original images (input image data) and which yet remains as well-modulated as the original images.

The foregoing description of this embodiment assumes that the images recorded on a film are read photoelectrically and then processed to compress their dynamic range. Of course, this is not the sole case of the present invention and the image data for DSC images recorded on a variety of media can also be used for compressing the dynamic range in essentially the same manner as in the case of using the image data for the images recorded on the film. As a result, the operator can get output image data that can produce photographic prints of high enough image quality without halo or other artifacts that reproduces the DSC images (input image data) and which yet remains as well-modulated as the DSC images.

The image processing apparatus of the present invention may in itself have the capability of compressing the dynamic range of input images; alternatively, it may be realized by the combination of a common personal computer system and a software program that runs on it. The program used in the present invention to compress the dynamic range of the input images applies the image processing method of the present invention in such a way as to generate output image data with a dynamic range to which the dynamic range of the input images has been compressed.

While the basics of the image processing apparatus and method of the present invention have been described in detail on the foregoing pages with reference to the preferred embodiment, the present invention is in no way limited to that embodiment and it should be understood that various improvements and modifications are possible without departing from the scope and spirit of the present invention.

What is claimed is:

1. An image processing apparatus for processing image data of an original image by compressing a dynamic range of said original image, comprising:
   a blurred image generating unit that has at least two edge preserving smoothing epsilon ($\epsilon$) filters having different characteristics and which processes the image data of said original image by continuous filtering with said at least two edge preserving smoothing filters to generate blurred image data which represents a blurred image of said original image; and
   a processing unit that processes the image data of said original image by compressing said dynamic range of said original image based on said blurred image data,
   said blurred image generating unit smoothing a pixel of interest and neighboring pixels in the image data of said original image to generate said blurred image data,
   said at least two edge preserving smoothing filters having a first epsilon ($\epsilon$) filter which filters signals for neighboring pixels by repeatedly replacing its value of a particular one of said neighboring pixels with a value other than zero if a difference from said signal for said pixel of interest is no smaller than a first threshold value $\epsilon_1$ and a second epsilon ($\epsilon$) filter which filters said signals for said neighboring pixels by repeatedly replacing its value of said particular one with zero if said difference from said signal for said pixel of interest is no smaller than a second threshold value $\epsilon_2$,
   said second epsilon ($\epsilon$) filter being provided at a stage subsequent to said first epsilon ($\epsilon$) filter,
   said first threshold value $\epsilon_1$ being set to be greater than said second threshold value $\epsilon_2$,
   a first mask size of said first epsilon ($\epsilon$) filter being set to be smaller than a second mask size of said second epsilon ($\epsilon$) filter.

2. An image processing method for processing image data of an original image by compressing a dynamic range of said original image by using a computer including a blurred image generating unit and a processing unit, comprising the steps of:
   processing the image data of said original image by continuous filtering with at least two edge preserving smoothing epsilon ($\epsilon$) filters having different characteristics to generate blurred image data which represents a blurred image of said original image by said blurred image generating unit of said computer; and
   processing the image data of said original image by compressing said dynamic range of said original image based on said blurred image data by said processing unit of said computer,
   said step of generating said blurred image data including:
   a step of smoothing a pixel of interest and neighboring pixels in said image data of said original image,
   a first epsilon ($\epsilon$) filter which filters signals for neighboring pixels by repeatedly replacing its value of a particular one of said neighboring pixels with a value other than zero if a difference from said signal for said pixel of interest is no smaller than a first threshold value $\epsilon_1$ and a second epsilon ($\epsilon$) filter which filters said signals for said neighboring pixels by repeatedly replacing its value of said particular one with zero if said difference from said signal for said pixel of interest is no smaller than a second threshold value $\epsilon_2$, being used as said at least two edge preserving smoothing filters,
   said first threshold value $\epsilon_1$ being set to be greater than said second threshold value $\epsilon_2$,
   a first mask size of the first epsilon ($\epsilon$) filter being set to be smaller than a second mask size of said second epsilon ($\epsilon$) filter, and
   after said image data of said original image being processed by filtering with said first epsilon ($\epsilon$) filter, processing by filtering with said second epsilon ($\epsilon$) filter is performed to generate said blurred image data.

* * * * *